(12) United States Patent
Sakai

(10) Patent No.: US 9,893,537 B2
(45) Date of Patent: Feb. 13, 2018

(54) POWER TRANSMISSION DEVICE AND WIRELESS POWER TRANSMISSION SYSTEM

(71) Applicant: Murata Manufacturing Co., Ltd., Nagaokakyo-shi, Kyoto-fu (JP)

(72) Inventor: Hironori Sakai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 231 days.

(21) Appl. No.: 14/823,150

(22) Filed: Aug. 11, 2015

(65) Prior Publication Data

US 2016/0036246 A1    Feb. 4, 2016

Related U.S. Application Data

(63) Continuation of application No. PCT/JP2013/084006, filed on Dec. 19, 2013.

(30) Foreign Application Priority Data

Feb. 13, 2013  (JP) .................................. 2013-025103

(51) Int. Cl.
*H02J 5/00* (2016.01)
*H02J 50/12* (2016.01)
(Continued)

(52) U.S. Cl.
CPC ................ *H02J 5/005* (2013.01); *H02J 5/00* (2013.01); *H02J 7/025* (2013.01); *H02J 50/05* (2016.02);
(Continued)

(58) Field of Classification Search
CPC .. H02J 50/12; H02J 5/005; H02J 7/025; H02J 50/80; H02J 50/10; H02J 50/60; H02J 7/35; H02J 3/383; H02J 3/46
(Continued)

(56) References Cited

U.S. PATENT DOCUMENTS

2007/0025125 A1\* 2/2007 Nakahori ................ H02M 1/32
363/56.02
2010/0225173 A1\* 9/2010 Aoyama ................. H02J 5/005
307/104

(Continued)

FOREIGN PATENT DOCUMENTS

JP  2009-268249 A  11/2009
JP  2011-083132 A   4/2011
(Continued)

OTHER PUBLICATIONS

International Search Report for PCT/JP2013/084006, dated Jan. 28, 2014.
(Continued)

*Primary Examiner* — John Poos
(74) *Attorney, Agent, or Firm* — Arent Fox LLP

(57) ABSTRACT

In a stand-by state where a power receiving device is not mounted on a power transmission device, ON/OFF of a switching element that applies an AC voltage to an active electrode and a passive electrode is controlled. A controller detects a potential difference between the active electrode and the passive electrode, and determines that the power receiving device is mounted on the power transmission device when the potential difference has changed. The controller starts ON/OFF control of switching elements and starts power transmission to the power receiving device from the power transmission device. With this, a power transmission device capable of achieving reduction in power consumption in the stand-by state and a wireless power transmission system including the same can be provided.

20 Claims, 4 Drawing Sheets

(51) Int. Cl.
*H02J 50/90* (2016.01)
*H04B 5/00* (2006.01)
*H02J 7/02* (2016.01)
*H02M 3/335* (2006.01)
*H02J 50/05* (2016.01)

(52) U.S. Cl.
CPC .............. *H02J 50/12* (2016.02); *H02J 50/90* (2016.02); *H02M 3/3353* (2013.01); *H04B 5/0037* (2013.01)

(58) Field of Classification Search
USPC ............................................ 307/64, 80, 104
See application file for complete search history.

(56) References Cited

U.S. PATENT DOCUMENTS

2011/0241435 A1    10/2011   Saito
2012/0049640 A1     3/2012   Ichikawa et al.

FOREIGN PATENT DOCUMENTS

JP      2011-229369 A    11/2011
JP       2012-70614 A     4/2012

OTHER PUBLICATIONS

Written Opinion of the International Searching Authority for PCT/JP2013/084006, dated Jan. 28, 2014.

\* cited by examiner

POWER TRANSMISSION DEVICE AND WIRELESS POWER TRANSMISSION SYSTEM

CROSS REFERENCE TO RELATED APPLICATIONS

The present application is a continuation of PCT/JP2013/084006 filed Dec. 19, 2013, which claims priority to Japanese Patent Application No. 2013-025103, filed Feb. 13, 2013, the entire contents of each of which are incorporated herein by reference.

FIELD OF THE INVENTION

The present invention relates to a power transmission device that wirelessly transmits electric power to a power receiving device mounted and a wireless power transmission system including the same.

BACKGROUND OF THE INVENTION

As a wireless power transmission system, an electric field coupling-type wireless power transmission system as disclosed in Patent Document 1 has been known, for example. In the system, power is transmitted to an active electrode of a power receiving device from an active electrode of a power transmission device with an electric field. In Patent Document 1, a switching frequency of a switching circuit that alternately drives a boosting circuit is swept in a state where a constant current is supplied to the switching circuit, and presence or absence of a maximum value in frequency characteristics of the voltage which is applied to the switching circuit is determined in the power transmission device. When the maximum value is present, the frequency is set as a driving frequency and power transmission is started. When the maximum value is absent, it is determined that the power receiving device is not mounted on the power transmission device and power transmission is not started.

Patent Document 1: Japanese Unexamined Patent Application Publication No. 2012-70614.

In Patent Document 1, the switching frequency of the switching circuit is swept so as to determine whether the power receiving device is mounted on the power transmission device. In this determination, it is necessary that the power transmission device keeps supplying a constant current to the switching circuit all the time. Therefore, in Patent Document 1, power consumption is increased in processing of detecting whether the power receiving device is mounted on the power transmission device. This raises a problem that power consumption in a standby state is increased.

SUMMARY OF THE INVENTION

An object of the present invention is to provide a power transmission device capable of achieving reduction in power consumption in a standby state and a wireless power transmission system including the same.

A power transmission device according to the invention includes a first alternating-current (AC) voltage generation circuit, a first electrode and a second electrode to which an AC voltage of the first AC voltage generation circuit is applied, a detection circuit that detects a potential difference between the first electrode and the second electrode, a second AC voltage generation circuit that applies an AC voltage of smaller power than that of the first AC voltage generation circuit to the first electrode and the second electrode, a first controller that controls ON/OFF of the first AC voltage generation circuit, and a second controller that controls ON/OFF of the second AC voltage generation circuit, wherein the first controller starts control so as to turn ON the first AC voltage generation circuit when the second controller controls an operation to turn ON the second AC voltage generation circuit and the potential difference detected by the detection circuit changes.

With this configuration, when an external device (to be specific, a power receiving device to which electric power is transmitted from the power transmission device) having electrodes opposing the first electrode and the second electrode is mounted on the power transmission device, power is transmitted to the external device from the power transmission device by electric field coupling via the first electrode and second electrode to which the AC voltage of the first AC voltage generation circuit is applied. The power transmission is started when the AC voltage of smaller power than that of the first AC voltage generation circuit, which is generated by the second AC voltage generation circuit, is applied between the first electrode and the second electrode in order to monitor mounting of the external device and the potential difference between the first electrode and the second electrode changes. That is to say, power consumption in mounting detection of the external device in the invention is smaller than that in an existing technique in which supply of a constant current to the first AC voltage generation circuit is kept all the time in order to detect mounting of the external device. With this, reduction in power consumption in a stand-by state can be achieved.

It is preferable that a rectifying circuit which rectifies a detection signal to be output to the first controller from the detection circuit be provided.

With this configuration, the first controller easily detects the potential difference based on the detection signal and the first controller performs control processing easily.

It is preferable that the detection circuit include a first voltage division circuit which detects a potential difference between the first electrode and the second electrode when the second controller controls an operation to turn ON the second AC voltage generation circuit, and a second voltage division circuit which detects a potential difference between the first electrode and the second electrode when the first controller controls an operation to turn ON the first AC voltage generation circuit.

With this configuration, the first voltage division circuit can detect the potential difference between the first electrode and the second electrode in a stand-by state whereas the second voltage division circuit can detect the potential difference between the first electrode and the second electrode at the time of power transmission during which a voltage of large power is applied to the first electrode and the second electrode. This makes it possible to determine abnormality during the power transmission when an output voltage of the second voltage division circuit is detected and found that the output voltage is changed, for example. Based on the determination, the first controller stops the operation of the first AC voltage generation circuit, thereby suppressing meaningless power consumption.

It is preferable that the second AC voltage generation circuit include a field effect transistor (FET) and that an amplification circuit connected to a gate of the FET be further provided.

With this configuration, the second AC voltage generation circuit can be reduced in size and reliable driving of the FET can be ensured.

According to the present invention, power consumption in mounting detection of an external device in the invention is smaller than that in an existing technique in which supply of a constant current to the first AC voltage generation circuit is kept all the time in order to detect mounting of the external device. With this, reduction in power consumption in a stand-by state can be achieved.

DETAILED DESCRIPTION OF THE EXEMPLARY EMBODIMENTS (First Embodiment)

Figure 1:
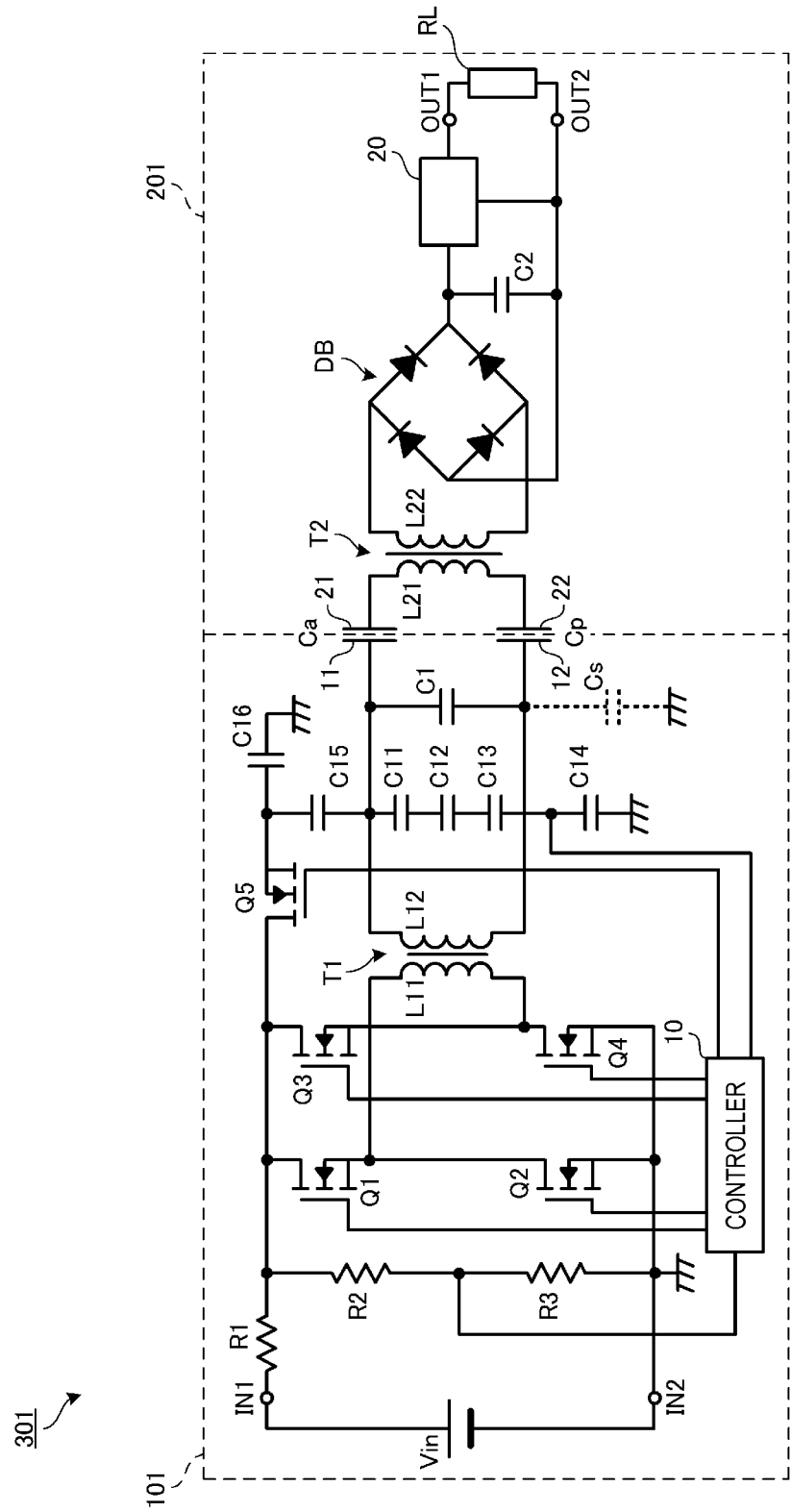
FIG. 1 is a circuit diagram of a wireless power transmission system according to a first embodiment.

FIG. 1 is a circuit diagram of a wireless power transmission system 301 according to a first embodiment. The wireless power transmission system 301 includes a power transmission device 101 and a power receiving device 201. The power receiving device 201 includes a load RL. The load RL is a secondary battery. The power receiving device 201 is a mobile electronic device, for example, including the secondary battery. As the mobile electronic device, a cellular phone, a personal digital assistant (PDA), a mobile music player, a notebook-type personal computer (PC), a digital camera, and the like are exemplified. The power receiving device 201 is mounted on the power transmission device 101 and the power transmission device 101 charges the secondary battery of the power receiving device 201.

A direct-current (DC) power supply Vin is connected to input terminals IN1 and IN2 of the power transmission device 101. The DC power supply Vin outputs a DC 5 V or 12 V. To be more specific, the power transmission device 101 is connected to a commercial power supply, for example, using an AC adapter (not illustrated). The AC adapter converts an AC voltage of the commercial power supply to a DC 5 V or 12 V and outputs it to the power transmission device 101. The power transmission device 101 operates using the input DC voltage as a power supply.

Voltage division resistors R2 and R3 for voltage detection are connected to the input terminals IN1 and IN2 via a resistor R1 for current detection. A DC-AC inverter circuit (first AC voltage generation circuit in the invention) that converts a DC voltage to an AC voltage is connected to the input terminals IN1 and IN2 via the resistor R1. The DC-AC inverter circuit includes switching elements Q1, Q2, Q3, and Q4. The switching elements Q1 and Q2 are connected in series and the switching elements Q3 and Q4 are connected in series. A control signal from a controller 10 is applied to each gate of the switching elements Q1, Q2, Q3, and Q4. With the application of the control signal, the switching elements Q1 and Q4 and the switching elements Q2 and Q3 are alternately turned ON and OFF.

A primary coil L11 of a boosting transformer T1 is connected to a connection point of the switching elements Q1 and Q2 and a connection point of the switching elements Q3 and Q4. An active electrode (first electrode in the invention) 11 and a passive electrode (second electrode in the invention) 12 are connected to a secondary coil L12 of the boosting transformer T1. The boosting transformer T1 boosts the AC voltage and applies the boosted AC voltage between the active electrode 11 and the passive electrode 12. A frequency of the AC voltage is in a range from 100 kHz to 10 MHz.

Although the boosting transformer is described above, the active electrode 11 and the passive electrode 12 may be directly connected to the connection point of the switching elements Q1 and Q2 and the connection point of the switching elements Q3 and Q4.

A capacitor Cs as indicated by a dashed line in FIG. 1 at the secondary side of the boosting transformer T1 is stray capacitance formed between a connection line of the passive electrode 12 and the ground.

A capacitor C1 is connected to the secondary coil L12 of the boosting transformer T1 in parallel. The capacitor C1 forms a series resonance circuit together with the secondary coil L12 of the boosting transformer T1 and leakage inductance (not illustrated).

The power receiving device 201 includes an active electrode 21 and a passive electrode 22. The active electrode 21 and the passive electrode 22 oppose the active electrode 11 and the passive electrode 12 of the power transmission device 101, respectively, with intervals therebetween when the power receiving device 201 is mounted on the power transmission device 101. The passive electrodes 12 and 22 may make direct contact with each other. A capacitor Ca as illustrated in FIG. 1 is capacitance formed between the active electrodes 11 and 21 and a capacitor Cp is capacitance formed between the passive electrodes 12 and 22.

A primary coil L21 of a step-down transformer T2 is connected to the active electrode 21 and the passive electrode 22. A diode bridge DB configured by four diodes is connected to a secondary coil L22 of the step-down transformer T2. The diode bridge DB is connected to output terminals OUT1 and OUT2 with a smoothing capacitor C2 and a DC-DC converter 20 interposed therebetween. The load RL as the secondary battery is connected to the output terminals OUT1 and OUT2.

When the power receiving device 201 is mounted on the power transmission device 101 and a voltage is applied between the active electrode 11 and the passive electrode 12 of the power transmission device 101, an electric field is generated between the active electrodes 11 and 21 arranged in an opposing manner. Then, power is transmitted to the power receiving device 201 from the power transmission device 101 with the electric field. In the power receiving device 201, an AC voltage induced by power transmission is stepped down by the step-down transformer T2; thereafter, the AC voltage is rectified, smoothened, and voltage-converted by the diode bridge DB, the smoothing capacitor C2, and the DC-DC converter 20, respectively, so as to be applied to the load RL.

A monitoring circuit is provided in the power transmission device 101. The monitoring circuit detects whether the power receiving device 201 is mounted in the stand-by state where power is not transmitted to the power receiving device 201 from the power transmission device 101. The monitoring circuit includes a voltage division circuit (detection circuit in the invention) having capacitors C11, C12, C13, C14, C15, and C16 and a switching element (second AC voltage generation circuit in the invention) Q5.

In the voltage division circuit, a series circuit formed by the capacitors C11, C12, C13, and C14 is connected between the active electrode 11 and the ground. A connection point of the capacitors C13 and C14 is connected to the controller 10 and the controller 10 detects an output voltage of the series circuit. The passive electrode 12 is connected to the ground via the stray capacitance Cs. That is to say, the controller 10 detects the output voltage of the series circuit so as to detect a potential difference between the active electrode 11 and the passive electrode 12.

Although the series circuit formed by the capacitors C11, C12, C13, and C14 is connected between the active electrode 11 and the ground in the above description, the series circuit may be connected between the active electrode 11 and the passive electrode 12. In this case, the capacitor C14 includes the stray capacitance Cs.

The switching element Q5 is an n-type MOS-FET and a source thereof is connected to a connection point of the capacitors C15 and C16 and a drain thereof is connected to the input terminal IN1 via the resistor R1. A control signal is applied to a gate thereof from the controller 10. The switching element Q5 is turned ON and OFF, so that the AC voltage converted from the DC voltage is applied to the active electrode 11. It should be noted that the second switching circuit in the invention may be configured by a plurality of switching elements and the switching element Q5 may be a p-type MOS-FET. The AC voltage includes rectangular waves, sine waves, and the like, and is not limited to a periodical waveform but may be an intermittent waveform.

Figure 2:
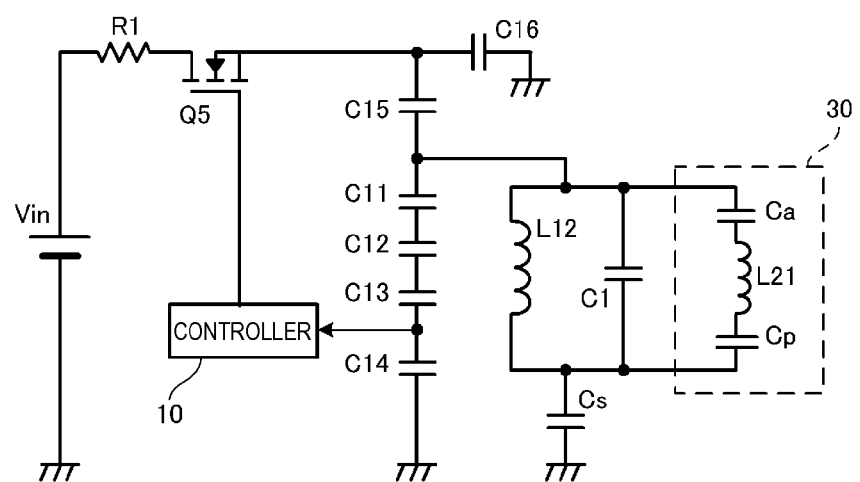
FIG. 2 is a circuit diagram for explaining a monitoring circuit in a power transmission device as illustrated in FIG. 1.

FIG. 2 is a circuit diagram for explaining the monitoring circuit in the power transmission device 101 as illustrated in FIG. 1.

As described above, the stray capacitance Cs is formed between the connection line of the passive electrode 12 and the ground. Therefore, the secondary coil L12 of the boosting transformer T1 and the capacitor C1 are connected to the ground via the stray capacitance Cs. In other words, a circuit in which the parallel circuit of the secondary coil L12 and the capacitor C1 is connected to the stray capacitance Cs in series, is connected to the series circuit of the capacitors C11 to C14 of the voltage division circuit in parallel.

When the power receiving device 201 is mounted on the power transmission device 101, a circuit in which a series circuit 30 formed by the capacitors Ca and Cp and the primary coil L21 of the step-down transformer T2 is connected to the secondary coil L12 and the capacitor C1 in parallel is formed. On the other hand, when the power receiving device 201 is not mounted on the power transmission device 101, the capacitors Ca and Cp are not formed. Therefore, a circuit in which the series circuit 30 is not connected to the secondary coil L12 and the capacitor C1 in parallel is formed. That is to say, circuit impedance changes between the case where the power receiving device 201 is mounted on the power transmission device 101 and the case where the power receiving device 201 is not mounted on the power transmission device 101.

In the stand-by state where the power receiving device 201 is not mounted on the power transmission device 101 and power is not transmitted to the power receiving device 201 from the power transmission device 101, the controller 10 performs switching control on the switching element Q5. With this, the DC voltage from the DC power supply Vin is converted to the AC voltage and the AC voltage is applied to the active electrode 11. The capacitor C15 connected between the switching element Q5 and the active electrode 11 smoothens the AC voltage that is applied to the active electrode 11. Further, the capacitor C16 is connected between the switching element Q5 and the ground, so that a charged voltage of the capacitor C1 and the like is discharged when the switching element Q5 is in the OFF state.

The controller 10 detects the output voltage of the voltage division circuit. In this case, the controller 10 detects a constant output voltage unless the power receiving device 201 is mounted on the power transmission device 101. The controller 10 does not perform switching control on the respective switching elements Q1, Q2, Q3, and Q4 of the DC-AC inverter circuit. With this, meaningless power consumption in the power transmission device 101 in the stand-by state can be suppressed.

When the power receiving device 201 is mounted on the power transmission device 101, the potential difference between the active electrode 11 and the passive electrode 12 changes being influenced by the series circuit 30. Therefore, the output voltage of the voltage division circuit, which is detected by the controller 10, also changes. When the detected output voltage changes, the controller 10 determines that the power receiving device 201 is mounted. Then, the controller 10 starts switching control of the respective switching elements Q1, Q2, Q3, and Q4 of the DC-AC inverter circuit. With this, power transmission to the power receiving device 201 from the power transmission device 101 is started. When driving control of the DC-AC inverter circuit is started, the controller 10 may stop the switching control of the switching element Q5.

In this manner, the controller 10 performs the switching control on the switching element Q5 so as to apply a voltage to the active electrode 11 and detect presence or absence of the power receiving device 201. The power consumption in this voltage application is smaller than power consumption of the controller 10 when the DC-AC inverter circuit is driven. The controller 10 starts driving control of the DC-AC inverter circuit when the power receiving device 201 is mounted. Therefore, the wireless power transmission system 301 according to the first embodiment can suppress power consumption in the stand-by state.

(Second Embodiment)

Figure 3:
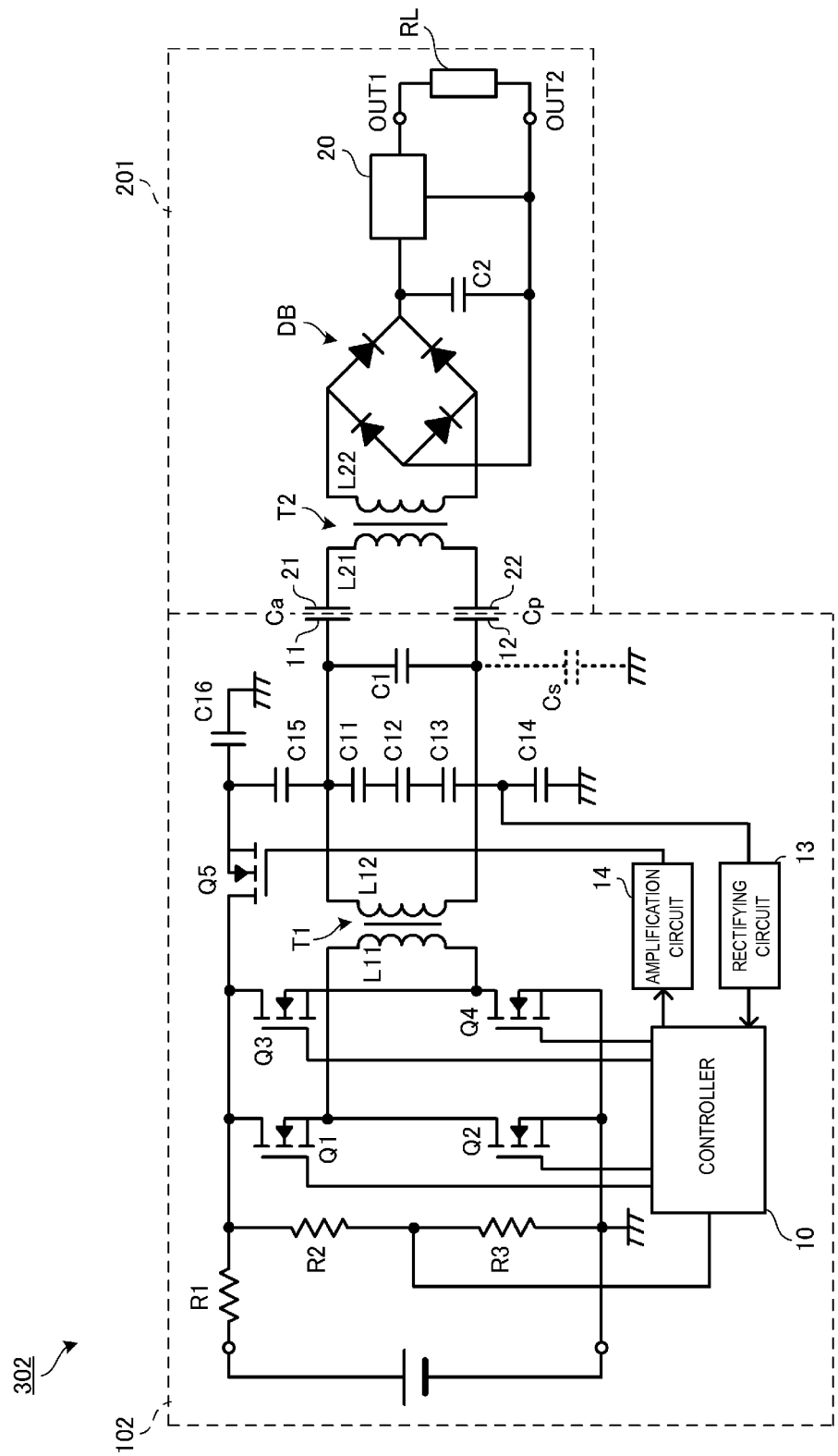
FIG. 3 is a circuit diagram of a wireless power transmission system according to a second embodiment.

FIG. 3 is a circuit diagram of a wireless power transmission system 302 according to a second embodiment. The wireless power transmission system 302 in the second embodiment is different from the first embodiment with respect to a monitoring circuit provided in a power transmission device 102.

In the monitoring circuit provided in the power transmission device 102, a rectifying circuit 13 is connected to a connection point of the capacitors C13 and C14 of the voltage division circuit. The controller 10 detects an output voltage of the voltage division circuit through the rectifying circuit 13. The output voltage of the voltage division circuit is rectified by providing the rectifying circuit 13. As a result, the output voltage of the voltage division circuit is converted to a DC voltage and is detected by the controller 10, so that control processing by the controller 10 can be performed easily.

An amplification circuit 14 is connected to the gate of the switching element Q5 as the n-type MOS-FET. The provision of the amplification circuit 14 increases a signal level to be applied to the active electrode 11. Therefore, a voltage to be applied to the rectifying circuit 13 is increased and a small amount of change is easy to be read.

(Third Embodiment)

Figure 4:
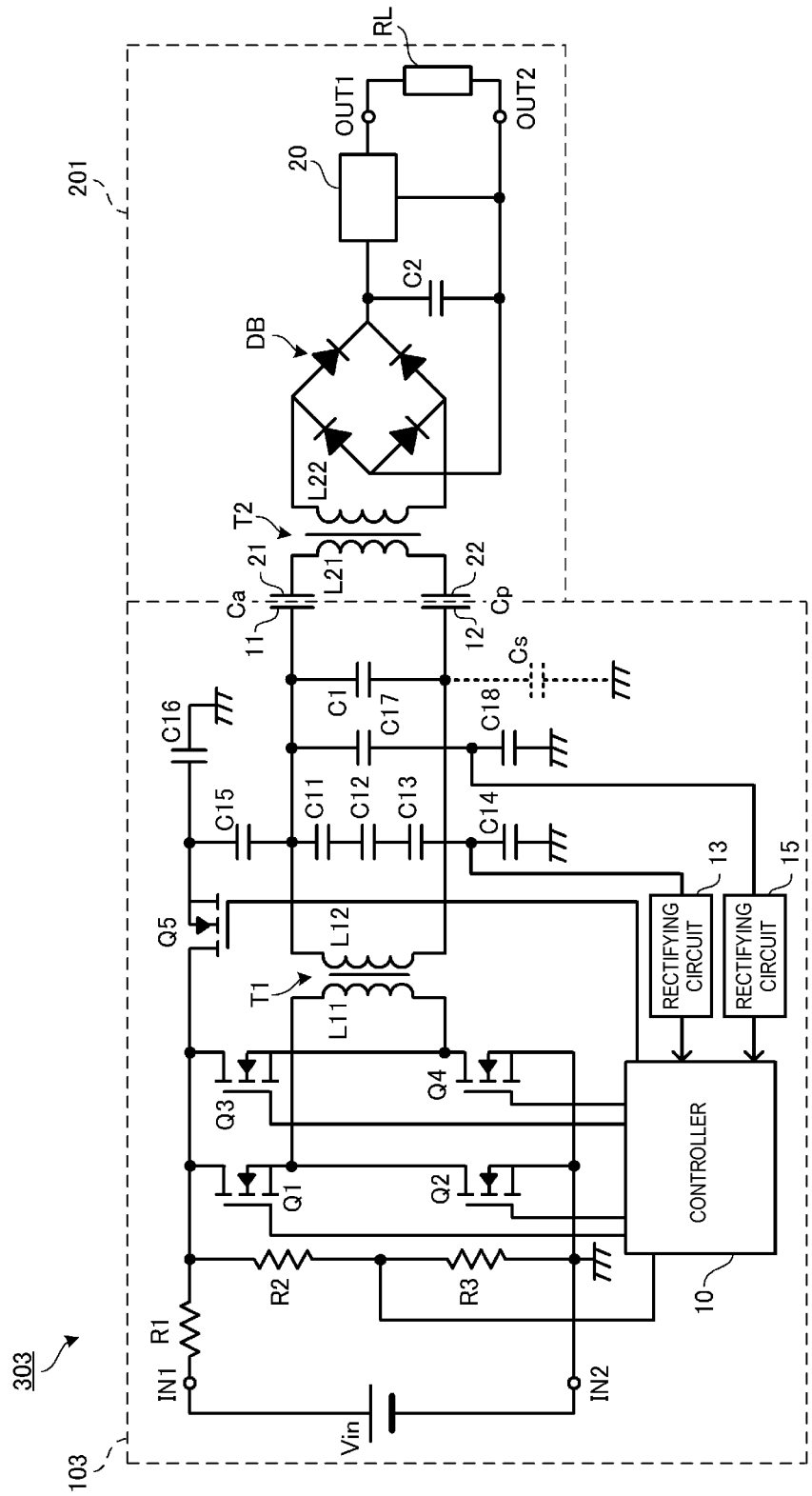
FIG. 4 is a circuit diagram of a wireless power transmission system according to a third embodiment.

FIG. 4 is a circuit diagram of a wireless power transmission system 303 according to a third embodiment. The wireless power transmission system 303 in the third embodiment is different from the first embodiment in that a monitoring circuit provided in a power transmission device 103 of the wireless power transmission system 303 includes two voltage division circuits. Hereinafter, the series circuit formed by the capacitors C11 to C14 is referred to as a first voltage division circuit.

In the monitoring circuit provided in the power transmission device 103, a series circuit (hereinafter, referred to as a second voltage division circuit) formed by capacitors C17 and C18 is connected to the series circuit formed by the capacitors C11 to C14 in parallel. A rectifying circuit 15 is connected to a connection point of the capacitors C17 and C18. The controller 10 detects an output voltage of the second voltage division circuit through the rectifying circuit 15.

The first voltage division circuit and the second voltage division circuit are different with respect to voltage division ratios. As in the first embodiment, a circuit constant of the first voltage division circuit is set such that a voltage to be applied to the active electrode 11 by switching control of the switching element Q5 is detected. A voltage division constant of the second voltage division circuit is set such that a voltage to be applied to the active electrode 11 during the power transmission to the power receiving device 201 from the power transmission device 103 by switching control of the switching elements Q1 to Q4 is detected.

The controller 10 can detect a potential difference between the active electrode 11 and the passive electrode 12 in a stand-by state based on the output voltage of the first voltage division circuit. Further, the controller 10 can detect a potential difference between the active electrode 11 and the passive electrode 12 to which a voltage of larger power than that in the stand-by state is applied based on the output voltage of the second voltage division circuit. With this, for example, the controller 10 detects presence or absence of the power receiving device 201 based on the output voltage of the first voltage division circuit and starts switching control of the DC-AC inverter circuit as needed. Further, the controller 10 detects presence or absence of the power receiving device 201 during the power transmission based on the output voltage of the second voltage division circuit and stops the switching control of the DC-AC inverter circuit as needed. This can avoid meaningless power consumption.

As described above, in the third embodiment, meaningless power consumption in the stand-by state can be suppressed. In addition, when the power receiving device 201 is detached while power is being transmitted, a problem that the power consumption is generated meaninglessly by continuously performing switching control on the DC-AC inverter circuit can be avoided.

REFERENCE SIGNS LIST

10 CONTROLLER (FIRST CONTROLLER, SECOND CONTROLLER)
11 ACTIVE ELECTRODE (FIRST ELECTRODE)
12 PASSIVE ELECTRODE (SECOND ELECTRODE)
13, 15 RECTIFYING CIRCUIT
14 AMPLIFICATION CIRCUIT
101, 102, 103 POWER TRANSMISSION DEVICE
201 POWER RECEIVING DEVICE
301, 302, 303 WIRELESS POWER TRANSMISSION SYSTEM
C11, C12, C13, C14, C15, C16 CAPACITOR (DETECTION CIRCUIT, FIRST VOLTAGE DIVISION CIRCUIT)
C17, C18 CAPACITOR (SECOND VOLTAGE DIVISION CIRCUIT)
Ca CAPACITOR BETWEEN ACTIVE ELECTRODES
Cp CAPACITOR BETWEEN PASSIVE ELECTRODES
Cs STRAY CAPACITANCE
Q1, Q2, Q3, Q4 SWITCHING ELEMENT (FIRST AC VOLTAGE GENERATION CIRCUIT)
Q5 SWITCHING ELEMENT (SECOND AC VOLTAGE GENERATION CIRCUIT)
RL LOAD
T1 BOOSTING TRANSFORMER
T2 STEP-DOWN TRANSFORMER
Vin DC POWER SUPPLY

The invention claimed is:

1. A power transmission device comprising:
a first alternating-current (AC) voltage generation circuit configured to provide an AC voltage;
a first planar electrode and a second planar electrode coupled to the first AC voltage generation circuit, each planar electrode being configured to wirelessly transmit power to a power receiving device through electric field coupling;
a detection circuit configured to detect a potential difference between the first planar electrode and the second planar electrode;
a second AC voltage generation circuit configured to apply an AC voltage of smaller power than the AC voltage of the first AC voltage generation circuit to the first planar electrode and the second planar electrode; and
a controller circuit configured to control ON/OFF states of the first and second AC voltage generation circuits,
wherein the first and second planar electrodes are coupled to outputs of the first and second AC voltage generation circuits,
wherein each of the first and second AC voltage generation circuits are configured to switch from the ON state to the OFF state to control which of the first and second AC voltage generation circuits applies the respective AC voltage to the first and second planar electrodes, and
wherein the controller circuit is coupled to the detection circuit and configured to turn ON the first AC voltage generation circuit and turn OFF the second AC voltage generation circuit when the detection circuit detects a change in potential difference between the first planar electrode and the second planar electrode.

2. The power transmission device according to claim 1, further comprising a rectifying circuit which rectifies a detection signal output from the detection circuit to the controller circuit.

3. The power transmission device according to claim 2, wherein the detection circuit includes:
a first voltage division circuit configured to detect a potential difference between the first planar electrode and the second planar electrode when the controller circuit turns ON the second AC voltage generation circuit; and
a second voltage division circuit configured to detect a potential difference between the first planar electrode and the second planar electrode when the controller circuit turns ON the first AC voltage generation circuit.

4. The power transmission device according to claim 3, wherein the first voltage division circuit comprises a plurality of capacitors coupled between the second AC voltage generation circuit and the rectifying circuit.

5. The power transmission device according to claim 4, wherein the second division circuit comprises at least one additional capacitor coupled in parallel with the first voltage division circuit.

6. The power transmission device according to claim 1, wherein the second AC voltage generation circuit comprises a field effect transistor (FET).

7. The power transmission device according to claim 6, wherein the second AC voltage generation circuit further comprises and an amplification circuit connected to a gate of the FET.

8. The power transmission device according to claim 1, wherein the first alternating-current (AC) voltage generation circuit comprises a first pair of switching elements coupled in series and a second pair of switching elements coupled in series.

9. The power transmission device according to claim 8, wherein the first alternating-current (AC) voltage generation circuit is a DC-AC inverter circuit with the controller circuit configured to provide a control signature to the switching elements to alternatively turn ON the first pair of switching elements and the second pair of switching elements.

10. The power transmission device according to claim 1, wherein the detection circuit detects a change in potential difference between the first planar electrode and the second planar electrode when the power receiving device is mounted to the power transmission device.

11. A wireless power transmission system that transmits electric power to a power receiving device from a power transmission device by electric field coupling,
the power receiving device comprising:
a power receiving-side active planar electrode;
a power receiving-side passive planar electrode; and
a power receiving-side circuit including a circuit that rectifies and smoothens an AC voltage generated on the power receiving-side active planar electrode and the power receiving-side passive planar electrode, and
the power transmission device including:
a power transmission-side active planar electrode that opposes the power receiving-side active planar electrode;
a power transmission-side passive planar electrode that directly contacts the power receiving-side passive planar electrode or opposes the power receiving-side passive planar electrode;
a first AC voltage generation circuit configured to provide an AC voltage;
a detection circuit configured to detect a potential difference between the power transmission-side active planar electrode and the power transmission-side passive planar electrode;
a second AC voltage generation circuit configured to apply an AC voltage of smaller power than the AC voltage of the first AC voltage generation circuit to the power transmission-side active planar electrode and the power transmission-side passive planar electrode; and
a controller circuit configured to control ON/OFF states of the first and second AC voltage generation circuits;
wherein the power transmission-side active and passive planar electrodes are coupled to outputs of the first and second AC voltage generation circuits,
wherein each of the first and second AC voltage generation circuits are configured to switch from the ON state to the OFF state to control which of the first and second AC voltage generation circuits applies the respective AC voltage to the power transmission-side active and passive planar electrodes, and
wherein the controller circuit is coupled to the detection circuit and configured to turn ON the first AC voltage generation circuit and turn OFF the second AC voltage generation circuit when the detection circuit detects a change in potential difference between the power transmission-side active and passive planar electrodes.

12. The wireless power transmission system according to claim 11, wherein the power transmission device further comprises a rectifying circuit which rectifies a detection signal output from the detection circuit to the controller circuit.

13. The wireless power transmission system according to claim 12, wherein the detection circuit of the power transmission device includes:
a first voltage division circuit configured to detect a potential difference between the power transmission-side active planar electrode and the power transmission-side passive planar electrode when the controller circuit turns ON the second AC voltage generation circuit; and
a second voltage division circuit configured to detect a potential difference between the power transmission-side active planar electrode and the power transmission-side passive planar electrode when the controller circuit turns ON the first AC voltage generation circuit.

14. The wireless power transmission system according to claim 13, wherein the first voltage division circuit comprises a plurality of capacitors coupled between the second AC voltage generation circuit and the rectifying circuit.

15. The wireless power transmission system according to claim 14, wherein the second division circuit comprises at least one additional capacitor coupled in parallel with the first voltage division circuit.

16. The wireless power transmission system according to Claim 11, wherein the second AC voltage generation circuit comprises a field effect transistor (FET).

17. The wireless power transmission system according to claim 16, wherein the second AC voltage generation circuit further comprises and an amplification circuit connected to a gate of the FET.

18. The wireless power transmission system according to claim 11, wherein the first alternating-current (AC) voltage generation circuit comprises a first pair of switching elements coupled in series and a second pair of switching elements coupled in series.

19. The wireless power transmission system according to claim 18, wherein the first alternating-current (AC) voltage generation circuit is a DC-AC inverter circuit with the controller circuit configured to provide a control signature to the switching elements to alternatively turn ON the first pair of switching elements and the second pair of switching elements.

20. The wireless power transmission system according to claim 11, wherein the detection circuit detects a change in potential difference between the power transmission-side active planar electrode and the power transmission-side passive planar electrode when a power receiving device is mounted to the power transmission device.

* * * * *